May 28, 1935. C. W. SINCLAIR 2,002,872
HUB CAP
Filed Feb. 23, 1932 3 Sheets-Sheet 1
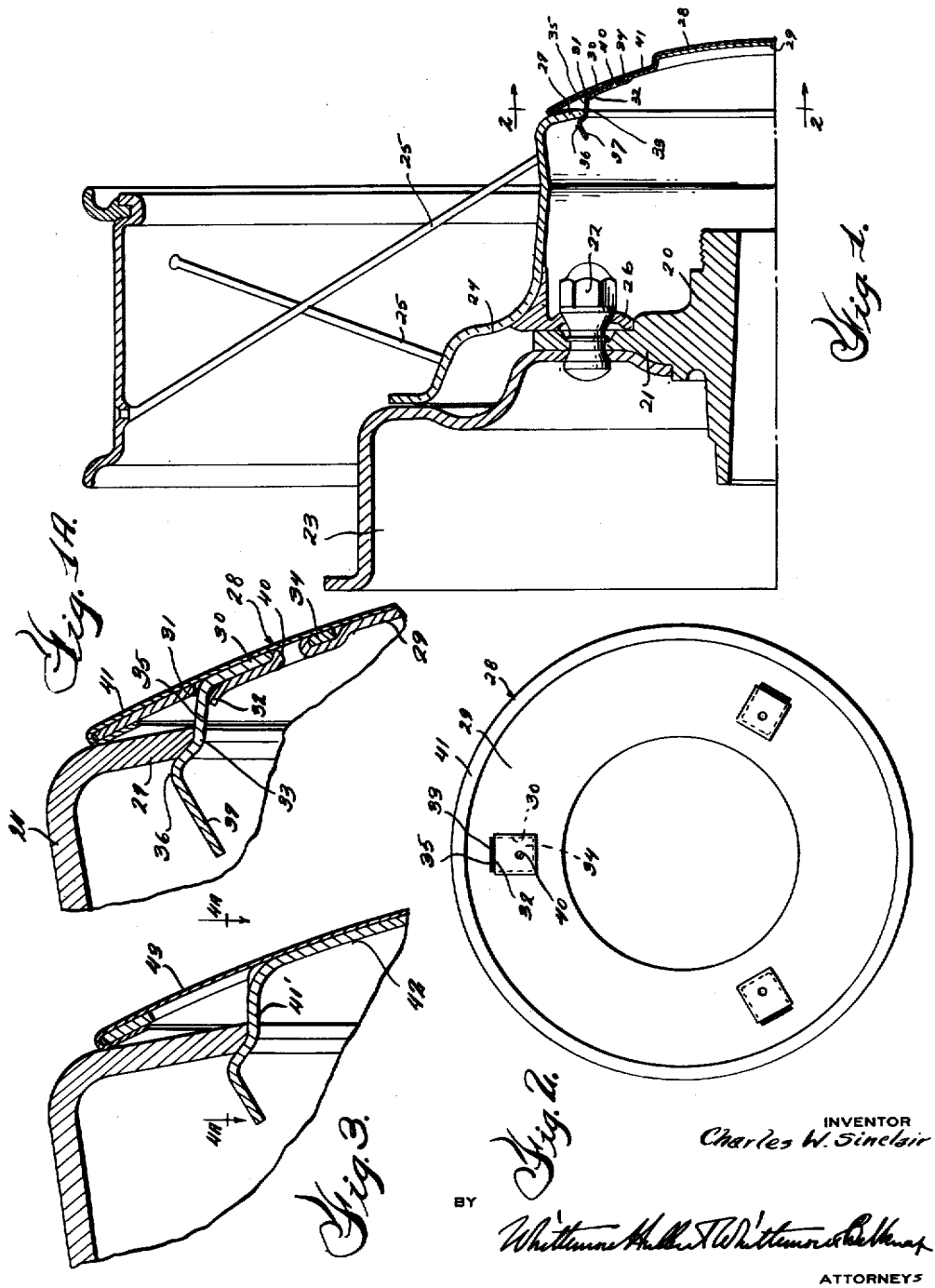
INVENTOR
Charles W. Sinclair
BY
ATTORNEYS

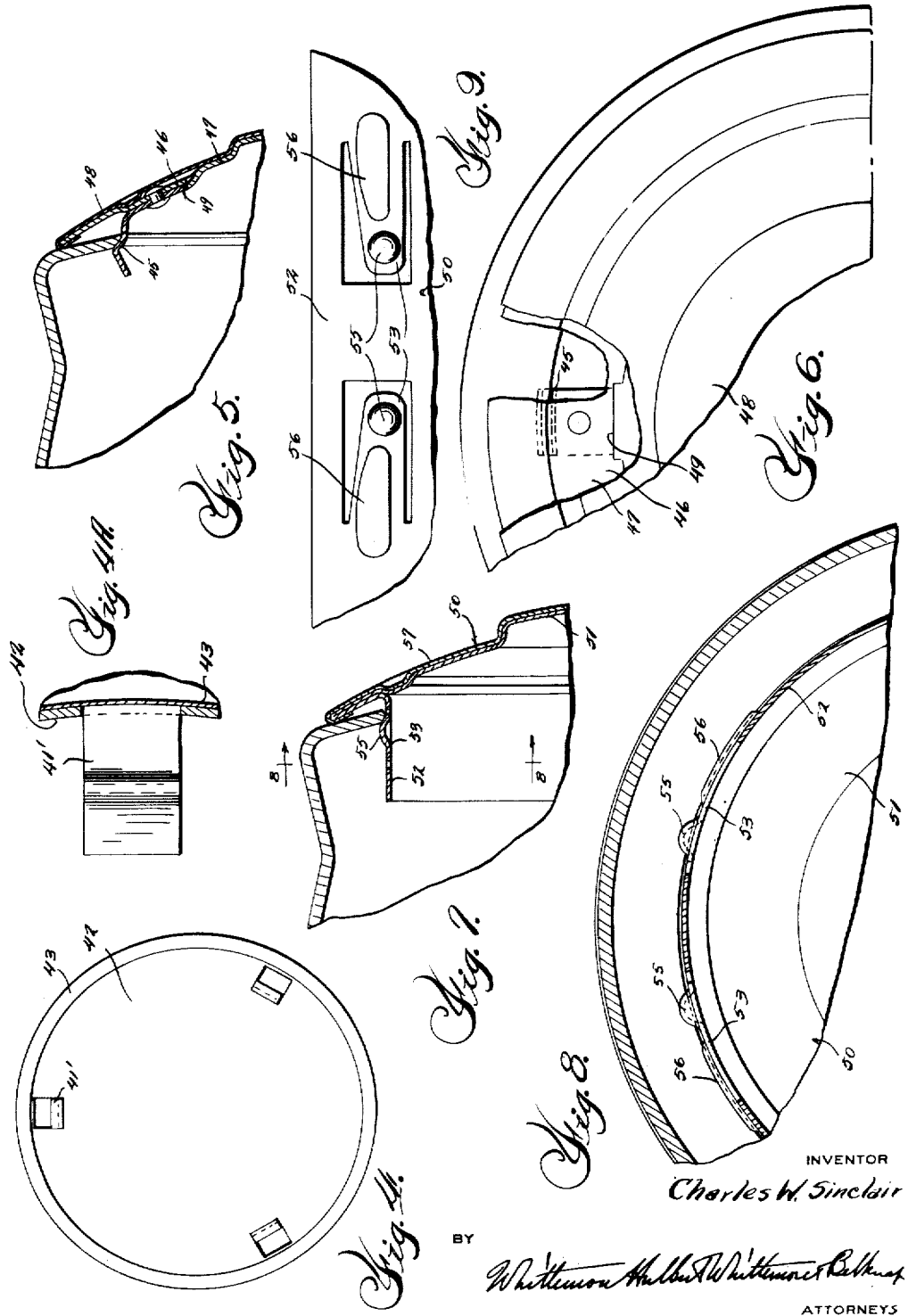

May 28, 1935.  C. W. SINCLAIR  2,002,872
HUB CAP
Filed Feb. 23, 1932   3 Sheets-Sheet 3
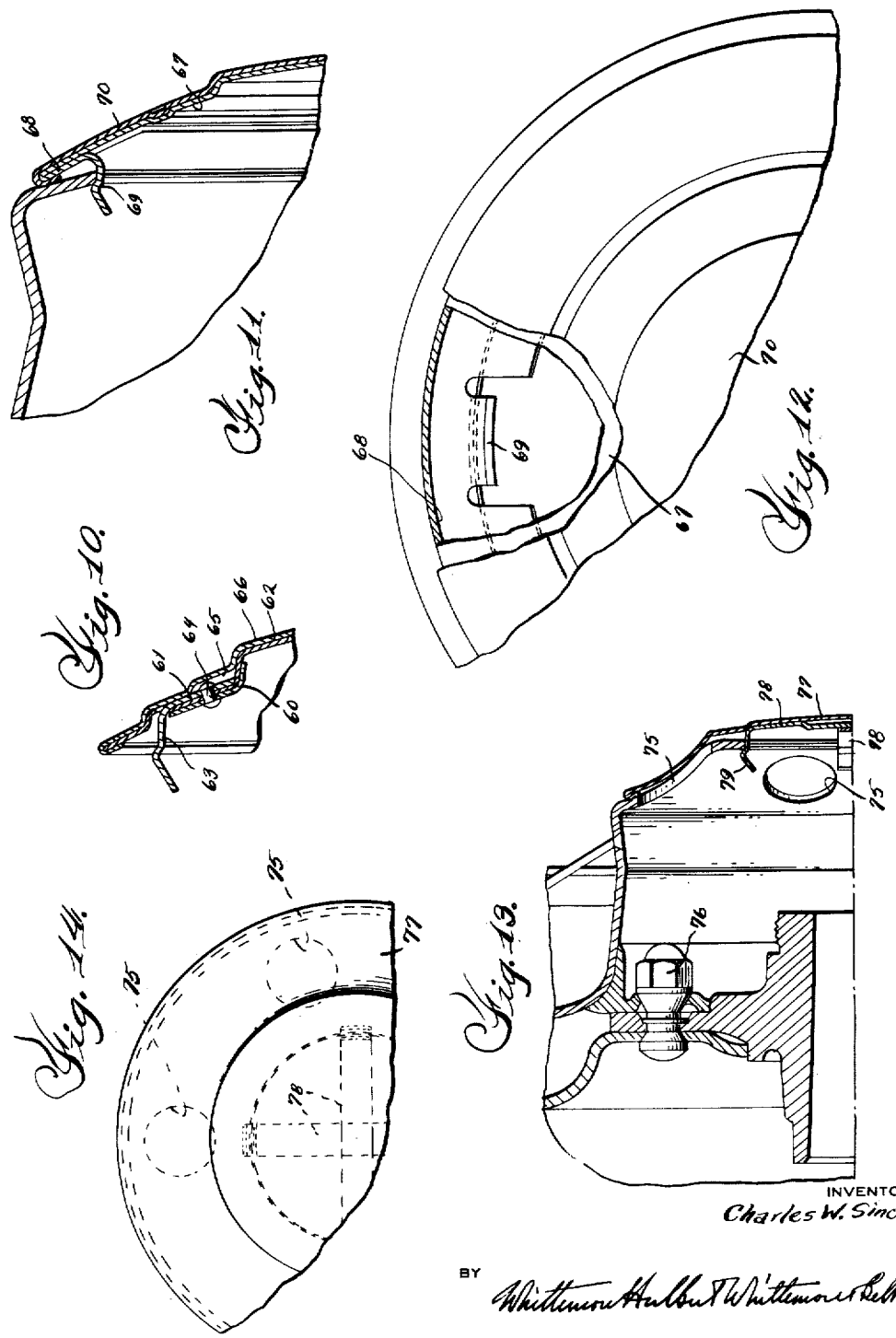
INVENTOR
Charles W. Sinclair
BY
ATTORNEYS Patented May 28, 1935

2,002,872

UNITED STATES PATENT OFFICE 2,002,872

HUB CAP

Charles W. Sinclair, Detroit, Mich., assignor, by mesne assignments, to The Kelsey-Hayes Wheel Company, Detroit, Mich., a corporation of Delaware Application February 23, 1932, Serial No. 594,684

4 Claims. (Cl. 301—108)

This invention relates generally to vehicle wheel hub caps and refers more particularly to hub caps for demountable vehicle wheels.

One of the principal objects of this invention is to improve generally hub caps of the above type by simplifying the construction and reducing the cost of manufacture thereof to a minimum as well as providing for expediently assembling and removing the same from the wheels with which they are employed.

With the foregoing, as well as other objects in view, the invention resides in the peculiar construction of the hub caps about to be described and the novel manner in which the same are removably secured in assembled relation with the vehicle wheels. These features will be made more apparent as this description proceeds, especially when considered in connection with the accompanying drawings, wherein:

Figure 1 is a fragmentary cross sectional view through a vehicle wheel equipped with a hub cap constructed in accordance with this invention;

Figure 1A is an enlarged view of a portion of Figure 1;

Figure 2 is a sectional view taken substantially on the line 2—2 of Figure 1;

Figure 3 is a fragmentary sectional view showing a slightly modified form of construction;

Figure 4 is a rear elevational view of the hub cap shown in Figure 3;

Figure 4A is a sectional view taken on the line 4A—4A of Figure 3;

Figure 5 is a fragmentary longitudinal sectional view showing another modified form of hub cap construction;

Figure 6 is a front elevational view of the construction shown in Figure 5 with the cover plate broken away for the sake of clearness;

Figure 7 is a view similar to Figure 5 showing another embodiment of the invention;

Figure 8 is a fragmentary sectional view taken substantially on the line 8—8 of Figure 7;

Figure 9 is a fragmentary top plan view of a portion of the cap illustrated in Figure 8;

Figure 10 is a fragmentary sectional view of another modified form of cap construction;

Figure 11 is a longitudinal sectional view through a portion of a vehicle wheel hub illustrating still another modified form of hub cap;

Figure 12 is a fragmentary front elevational view of the construction shown in Figure 11 with a portion of the cover plate broken away for the sake of clearness;

Figure 13 is a view similar to Figure 1 showing still another embodiment of the invention; and Figure 14 is a front elevational view of the construction shown in Figure 13.

Although the hub caps forming the subject matter of this invention may be utilized in connection with various types of vehicle wheels, nevertheless, I have shown the same herein for the purpose of illustration as employed in association with vehicle wire wheels. The various constuctions of hub caps shown in Figures 1 to 12, inclusive, are of such design as to permit utilizing the same in connection with the wire wheel fragmentarily illustrated in Figure 1 and comprising an inner hub 20 having a radially outwardly extending attaching flange 21 intermediate the ends thereof apertured at circumferentially spaced points to provide for the passage of the fastener elements 22 therethrough. Secured to the rear face of the flange 21 by the fastener elements 22 is a suitable brake drum 23 which may be of any desirable construction and configuration since it forms no part of the present invention. Surrounding the inner hub 20 in advance of the web of the brake drum 23 is a hub shell 24 forming anchorage means for the inner ends of the spokes 25 of the wheel and provided intermediate the ends thereof with inwardly extending lugs 26 adapted to be secured to the front side of the radial flange 21 on the inner hub by means of the fastener elements 22. As is usually the case in constructions of the above type, the forward end of the hub shell terminates in an inwardly extending annular flange 27 forming the nose of the shell and serving as anchorage means for the various types of hub caps about to be described. In all the modifications shown in Figures 1 to 12, inclusive, the length of the annular flange 27 is so designed as to provide a central opening in the front side of the shell of sufficient diameter to permit readily manipulating the fastening means 22 to assemble the wheel with or remove the same from the inner hub by extending a suitable wrench through the front side of the shell.

Referring now more in detail to the specific embodiment of the invention illustrated in Figures 1, 1A and 2, it will be noted that the opening in the front side of the hub shell 24 is normally closed by the hub cap designated generally by the reference character 28. The hub cap 28 comprises a bowed disk-like body 29 of sufficient dimension to overlap the outer sides of the nose 27 of the hub shell when in assembled relation therewith and is formed with circumferentially spaced rearwardly extending depressions 30 in the front face thereof spaced radially inwardly from the periphery of the same. Prior to bending the body 29 to form the depressions 30, the body is severed at points coinciding with the outer edges of the depressed portions so that upon fashioning the depressions, the outer edges of the latter move rearwardly relative to the adjacent edges of the body. The outer edge portions of the depressions are then bent axially rearwardly to form elongated slots 31, and, incidentally, provide shoulders 32 for reinforcing the spring fingers about to be described. Fixed to the body 29 of the cap for attaching the same to the shell is a plurality of clips 33 corresponding in number to the number of depressions 30 and having body portions 34 located within the depressions. Formed integral with the outer edges of the body portions 34 of the clips and extending axially rearwardly through the slots 31 in the body of the cap are suitable fingers 35 having portions intermediate the ends thereof bent outwardly to form beads 36. The beads 36 are arranged concentric with the axis of the body 29 and are so positioned radially of the cap with respect to the diameter of the opening through the shell as to have a snap engagement with the inner edges of the hub shell nose 27 to yieldably secure the cap in place. The extreme rear ends of the fingers taper radially inwardly from the outermost portions of the beads to form pilots 37 for initially centering the cap relative to the shell and for subsequently guiding the cap in assembled relation with the shell.

With the construction as thus far described, it will be apparent that when it is desired to assemble the cap with the shell, the tapered portions 37 of the fingers are merely engaged with the inner edges of the hub shell nose 27 and the cap moved axially rearwardly relative to the shell. Inasmuch as the outer ends of the tapered portions 37 or beads 36 are arranged on a diameter greater than the diameter of the opening through the nose of the shell, movement of the cap rearwardly relative to the shell causes the inner edges of the nose to deflect the fingers radially inwardly until the beads 36 are moved rearwardly beyond the said edges whereupon the fingers in attempting to assume their normal positions, spring radially outwardly and engage the beads with the rear side of the nose 27. It will be observed from Figure 1A that the beads 36 are so positioned axially of the fingers with respect to the periphery of the cap that the latter is held by the beads in engagement with the nose under a slight tension. The above arrangement is obviously such as to permit readily removing the cap from the hub shell nose by inserting a tool between the periphery of the cap and nose and by manipulation of the tool causing forward movement of the cap relative to the shell.

From the foregoing it will be seen that each time the cap is assembled with or removed from the shell, the fingers 35 are deflected relative to the body portions thereof which has a tendency to weaken the joint between the fingers and body portions aforesaid thereof. In the present instance, the above tendency is reduced to the minimum and the spring action of the fingers stabilized by the shoulders 32 hereinbefore described. These shoulders are formed on the cap and engage the fingers adjacent the joint between the latter and body portions of the clips and as a consequence, serve to distribute the bending stresses of the fingers over a greater portion thereof.

While the body portions 34 of the clips 33 may be secured within the depressions 30 by a welding operation, if desired, nevertheless, I have shown the body portions of the clip as being riveted in place. In detail, the body portions 34 of the clips are provided with openings therethrough and the metal of the cap body opposite the openings is extruded as at 40 and riveted to the clips. This arrangement is relatively inexpensive and provides the necessary rigid connection between the clips and the cap. The depth of the depressions 30 is so determined with respect to the gage of the clips that the outer surfaces of the body portions of the latter lie substantially flush with the outer surface of the cap body 29 and are concealed by a cover plate 41. The cover plate 41 extends over substantially the entire outer surface of the cap and is return bent at the outer edges thereof around the periphery of the body 29 of the cap so as to provide a unitary construction.

In Figures 3 and 4, I have illustrated a modified form of hub cap wherein the spring fingers 41' are struck out of the body 42 of the cap. The spring fingers 41' function in the same manner as the fingers 35 set forth in the first described form of the invention to secure the hub cap in assembled relation with the shell. In other, words, the fingers 41' are fashioned to have a snap engagement with the nose of the shell and to maintain a slight tension between the periphery of the cap and adjacent portion of the shell. The joint between the fingers and body portion of the cap assumes the cross sectional configuration illustrated in Figure 4A so as to reinforce the fingers and stabilize the resiliency thereof. The slots formed by striking the fingers 41' out of the body as well as the fingers themselves are concealed from the front side of the cap by means of a cover 43 similar in construction to the cover 41 hereinbefore described and secured to the body of the cap in the same manner.

In the embodiment of the invention illustrated in Figure 5, the spring fingers 45 are in the form of separate clips riveted or otherwise suitably secured to the depressed portions 46 of the hub cap body 47. In the event the fingers 45 are riveted to the body 47 of the cap, the depth of the depressed portion is so determined that the forward end of the rivet lies substantially flush with the outer surfaces of the cap adjacent the depressed portions. The arrangement is such that when the cover 48 is extended over the outer surface of the cap body as in the first described form of the invention, the same will conceal the rivets and depressed portions. The inner edges of the fingers 45 are positioned upon shoulders 49 struck rearwardly from the body 47 of the cap as clearly shown in Figure 5. The rear end portions of the fingers 45 are fashioned in the same manner as the fingers hereinbefore described in connection with the first embodiment of the invention and function in the same manner as the latter to secure the cap in position upon the nose of the shell.

The hub cap 50 illustrated in Figures 7 to 9, inclusive, differs from the caps hereinbefore described in that the body 51 of the cap is return bent at the periphery thereof and terminates in an annular rearwardly extending pilot 52 of sufficient diameter to extend through the opening in the front side of the shell. While the construction of the cap 50 differs from the construction of either of the foregoing caps, nevertheless, the same is also secured to the shell by having a snap engagement therewith. The foregoing is accomplished in the present instance by providing a plurality of circumferentially spaced groups of spring fingers 53. The spring fingers 53 are blanked out of the annular pilot 52 of the body 51 as shown in Figure 9 and are preferably spaced circumferentially of the annular portion 52 concentric with the latter. The ends of the fingers are upset to form semispherical surfaces 55 having the outer portions thereof projecting beyond the periphery of the annular portion 52 so as to have a snap engagement with the inner edges of the hub shell nose. As will be apparent from Figure 9, the fingers 53 are reinforced by suitable ribs 56 pressed out from the pilot and fingers and extending across the line of juncture of the fingers with the pilot 52 on the cap. The cap 50 may also be provided with a cover 57 for the body 51 secured in place in the same manner as the covers hereinbefore described by having the marginal edges return-bent over the periphery of the body 51 of the cap.

The modification illustrated in Figure 10 is similar to the construction shown in Figure 1 with the exception that reinforcing strips 60 are provided for embracing the rear sides of the depressed portions 61 of the cap body 62. The arrangement is such that the portions of the body 62 with which the spring fingers 63 engage are reinforced by the strips 60 and as shown in Figure 10, the fingers, together with the strips, are secured to the depressed portions 61 by means of the rivets 64. The front sides of the rivets 64 are located within depressed portions 65 in the body 62 so as to be concealed from view when the cover 66 is in assembled relation with the body.

In the embodiment of the invention illustrated in Figures 11 and 12, the peripheral portions of the cap body 67 are return-bent as at 68 and spring fingers 69 are severed out of the return-bent portion 68 at circumferentially spaced points. The fingers 69 are fashioned to have a snap engagement with the nose of the hub shell in the same manner as the fingers set forth in the first described form of the invention and function to yieldably clamp the peripheral portions of the cap into engagement with the adjacent sides of the hub shell nose. If desired, the body 67 of the cap in the present instance may also be concealed by a suitable cover 70 extending over the front side of the body and having the peripheral edges thereof return-bent over the corresponding portions of the body 67.

The hub cap illustrated in the modification of the invention illustrated in Figures 13 and 14 finds particular utility when employed in connection with wire wheel hub shells of the type wherein the opening through the nose of the shell is relatively small necessitating the provision of separate openings 75 in the nose opposite the fastener elements 76 so as to permit engaging the fastener elements by extending a wrench through the openings 75. The hub cap illustrated in the above figures comprises a body 77 of such dimension as to conceal the openings 75 through the nose of the shell when in assembled relation therewith and is removably secured to the shell by a pair of clips 78 welded or otherwise suitably secured to the central portions thereof opposite the opening in the nose of the shell. The clips are bent rearwardly at the outer ends thereof to form spring fingers 79 and the latter are fashioned to snap into engagement with the inner edges of the hub shell nose upon axial movement of the cap rearwardly relative to the shell as clearly shown in Figure 13.

From the foregoing description, it will be observed that while each of the embodiments of the invention differ structurally from each other, nevertheless, all of the various constructions are extremely simple and are capable of being inexpensively manufactured. It will further be observed that all of the hub caps illustrated and described herein are fashioned to have a snap engagement with a wheel body member and for this purpose are each provided with spring fingers having upset portions so arranged as to provide for securing the desired snap engagement and at the same time to provide for securing the peripheral portions of the cap to the outer sides of the nose under tension. In addition to the foregoing, it is to be noted that each of the hub caps set forth above are provided with pilots for centering and guiding the caps in engagement with the wheel body. The hub caps in each instance are assembled with the wheel by merely inserting the pilots on the caps into the opening provided therefor in the wheel body and moving the caps rearwardly relative to the wheel body. Removal of the caps in each instance may be effected by merely inserting a tool between the periphery of the cap and the adjacent side of the wheel and by suitable manipulation of the tool moving one side of the cap outwardly relative to the wheel and thereby disengaging the spring fingers from the wheel. Thus, it will be apparent that the hub caps shown herein, in addition to being relatively simple and inexpensive in construction, are capable of being readily assembled with and removed from the wheel.

While several embodiments of the invention have been shown and described herein somewhat in detail, nevertheless, it is to be understood that no attempt has been made to show all of the modifications of the invention and accordingly, reservation is made to make such changes as may come within the purview of the accompanying claims.

What I claim as my invention is:

1. A hub cap provided with a body portion having spaced slots therethrough and having depressions in the front side thereof, and clips having portions disposed within the depressions flush with the front surfaces thereof and having spring fingers extending rearwardly from the cap body through the slots aforesaid.

2. A hub cap provided with a disk-like body having slots spaced circumferentially of the body radially inwardly from the periphery thereof and having depressions in the front sides thereof adjacent the slots, spring clips having body portions secured within the depressions substantially flush with the front surfaces of the body and having flexible fingers extending rearwardly therefrom through said slots.

3. A hub cap provided with a body portion having a plurality of spaced slots therein and having depressions in the front face thereof adjacent said slots, spring clips having body portions located within the depressions and having flexible fingers extending rearwardly through said slots, reinforcing members embracing the rear sides of the depressed portions aforesaid, and means for securing the clips and reinforcing members to the body portion of the cap.

4. A hub cap having a body portion for closing an opening in the front side of a wheel body, means on the cap body for removably securing the same to the wheel body including spring clips having body portions in contact with the front sides of the cap body and having flexible fingers extending axially rearwardly through slots formed in the cap body and fashioned to have a snap engagement with the inner edges of the opening aforesaid, and shoulders extending rearwardly from said cap body and reinforcing the inner sides of the fingers adjacent the juncture of the latter with the clips to provide for distributing the bending stresses of the fingers over a relatively large area thereof.

CHARLES W. SINCLAIR.